(No Model.)

A. CALLAHAN.
MILLSTONE DRIVER.

No. 253,681. Patented Feb. 14, 1882.

WITNESSES:
W. W. Hollingsworth
W. Read

INVENTOR:
Amos Callahan
BY
ATTORNEYS.

UNITED STATES PATENT OFFICE.

AMOS CALLAHAN, OF MARYVILLE, TENNESSEE, ASSIGNOR TO HIMSELF AND WILLIAM J. DAVIS, OF SAME PLACE.

MILLSTONE-DRIVER.

SPECIFICATION forming part of Letters Patent No. 253,681, dated February 14, 1882.

Application filed December 1, 1881. (No model.)

*To all whom it may concern:*

Be it known that I, AMOS CALLAHAN, of Maryville, in the county of Blount and State of Tennessee, have invented a new and Improved Millstone-Driver; and I do hereby declare that the following is a full, clear, and exact description of the same, reference being had to the accompanying drawings, forming part of this specification, in which—

Figure 1:
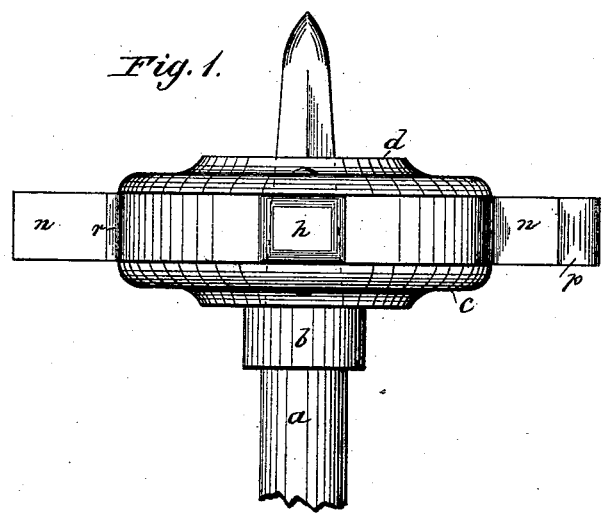
Figure 2:
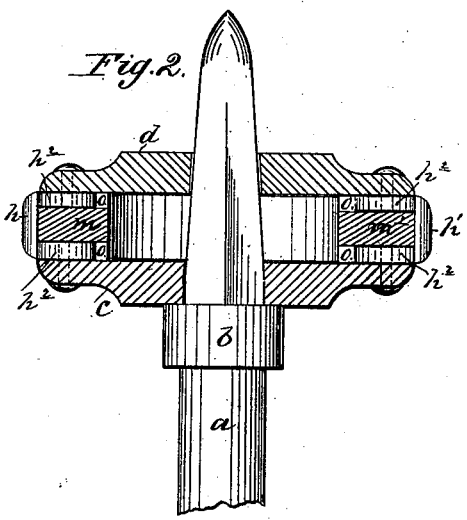
Figure 3:
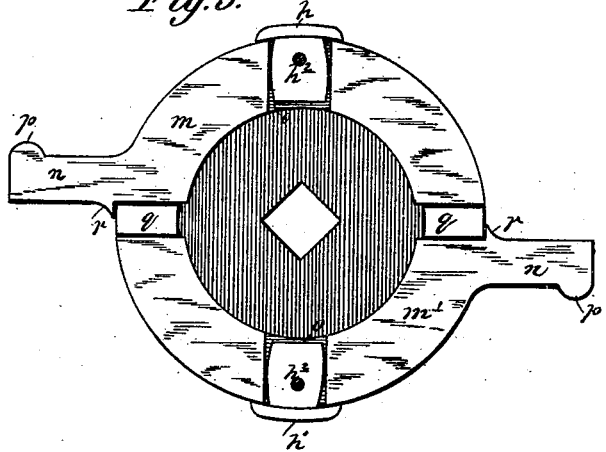
Figure 4:
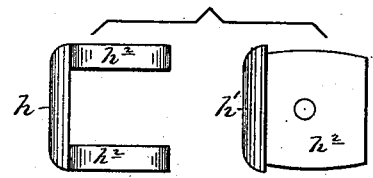

Figure 1 is a side elevation of my improved millstone-driver. Fig. 2 is a vertical central section. Fig. 3 is a plan view with the upper plate removed, and Fig. 4 is a detail view.

My invention relates to improvements in millstone-drivers; and it consists of a sectional driver made in two separate parts, with semicircular inner ends, connected together by plates secured to each other by angular arms having lugs, and provided with blocks of rubber inserted between the semicircular ends of the sectional driver and forming self-adjusting and elastic bearings for the driver, as hereinafter more fully set forth.

In the accompanying drawings, $a$ represents a mill-spindle, provided with a collar, $b$, near its upper end, on the upper face of which collar rests a circular plate, $c$, fast on the spindle and adapted to revolve therewith, and provided with a central orifice for the passage of the spindle.

$d$ represents a circular upper plate, of the same diameter as the lower circular plate, $c$, and provided with a similar central orifice for the passage of the spindle. The upper and lower plates, $c\ d$, are parallel with each other, and are connected together by the opposite arms, $h\ h'$, of the same length, each arm being provided at its upper and lower ends with lugs $h^2$, which are riveted to the upper and lower plates, thus firmly securing the two plates together. The longitudinal sides of the lugs $h^2$ are slightly curved, as seen in the drawings.

$m\ m'$ represent the two parts of a sectional driver, alike in construction, and each consisting of a semicircular inner part hollowed out semicircularly, so as to be concentric with the circular orifices in the circular plates $c\ d$, and each provided with an arm, $n$, the outer end of which is adapted to fit in one of the opposite recesses made in the eye of the runner. The upper and lower faces of the semicircular parts of the sectional driver are each provided with opposite recesses, $o\ o$, which receive the lugs $h^2$, riveted to the plates, thereby allowing the parts $m\ m'$ of the sectional driver to slide back and forth on the lugs, and at the same time have a slightly circular motion on the lugs as centers in consequence of the curved form of the longitudinal sides of the lugs, as hereinbefore described. Each arm $n$ is provided on its outer end, on the side which presses against the side of the recess in the runner, with a rounded projection, $p$. The parts $m\ m'$ of the sectional driver are of a little less thickness than the distance between the upper and lower plates, $c\ d$, so that they may readily be inserted between them, and the parts of the sectional driver may be removed and reversed when desired.

$q\ q$ represent blocks of rubber, which are inserted in the opposite spaces between the parts $m\ m'$ of the sectional driver, which in the revolution of the driver are prevented from falling outwardly into the eye of the stone by the lugs $r\ r$, secured to the inner faces of the parts $m\ m'$ of the sectional driver; or any other suitable means may be employed to hold the rubber blocks in place. The runner is poised by a balance-rynd of the usual construction.

By this construction it will be seen that a self-adjusting and elastic bearing is provided for both arms of the sectional driver, and that all jar and backlash which arise when rigid bearings are employed is prevented, and that both the ends of the arms in the recesses of the runner are brought to bear alike against the runner by reason of the sliding movement of the parts of the sectional driver on the lugs.

What I claim as my invention is—

1. The combination, with a sectional driver, made in two separate parts, $m\ m'$, plates $c\ d$, opposite angular arms, $h\ h'$, secured to said plates, of the rubber blocks $q\ q$, inserted in the open spaces at the ends of the separate parts of the sectional driver, substantially as described, and for the purpose set forth.

2. The combination, with the upper and lower plates, $c\,d$, and opposite arms, $h\,h'$, provided with lugs $h^2$ at right angles to the arms and riveted to the plates, of the sectional driver, made in two separate reversible parts, $m\,m'$, each semicircular at its inner end, and provided with the recess $o$ and arm $n$, and the rubber blocks $q\,q$, inserted between the ends of the parts of the sectional driver, substantially as described, and for the purpose set forth.

AMOS CALLAHAN.

Witnesses:
C. T. CATES,
R. N. HOOD.